United States Patent
Kang

(10) Patent No.: US 11,775,211 B2
(45) Date of Patent: Oct. 3, 2023

(54) MEMORY CONTROLLER AND METHOD OF OPERATING THE SAME

(71) Applicant: SK hynix Inc., Icheon-si (KR)

(72) Inventor: Hye Mi Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 152 days.

(21) Appl. No.: 17/182,008

(22) Filed: Feb. 22, 2021

(65) Prior Publication Data

US 2022/0066696 A1 Mar. 3, 2022

(30) Foreign Application Priority Data

Aug. 27, 2020 (KR) .......................... 10-2020-0108401

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0656; G06F 3/0658; G06F 11/1044; G06F 13/1673; G06F 13/1631; G06F 13/1642
See application file for complete search history.

(56) References Cited

U.S. PATENT DOCUMENTS

| | | | |
|---|---|---|---|
| 2019/0012111 A1* | 1/2019 | Li | G06F 3/0685 |
| 2021/0271414 A1* | 9/2021 | Spica | G06F 3/0659 |
| 2021/0405914 A1* | 12/2021 | Lam | G06F 12/0246 |

FOREIGN PATENT DOCUMENTS

| | | |
|---|---|---|
| KR | 10-2017-0092430 A | 8/2017 |
| KR | 10-2019-0090268 A | 8/2019 |

* cited by examiner

*Primary Examiner* — Masud K Khan

(57) ABSTRACT

The present technology relates to an electronic device. A memory controller according to the present technology may include a host interface controller, a plurality of buffers, and a memory operation controller. The host interface controller may sequentially generate a plurality of commands based on a request received from a host. The plurality of buffers may store the plurality of commands according to command attributes. The memory operation controller may compare a sequence number of a target command stored in a target buffer among the plurality of buffers with a sequence number of a standby command stored in remaining buffers, and may determine a process of the target command and a process of the standby command based on a comparison. wherein a buffer satisfying a flush condition among the plurality of buffers is selected as the target buffer.

18 Claims, 9 Drawing Sheets

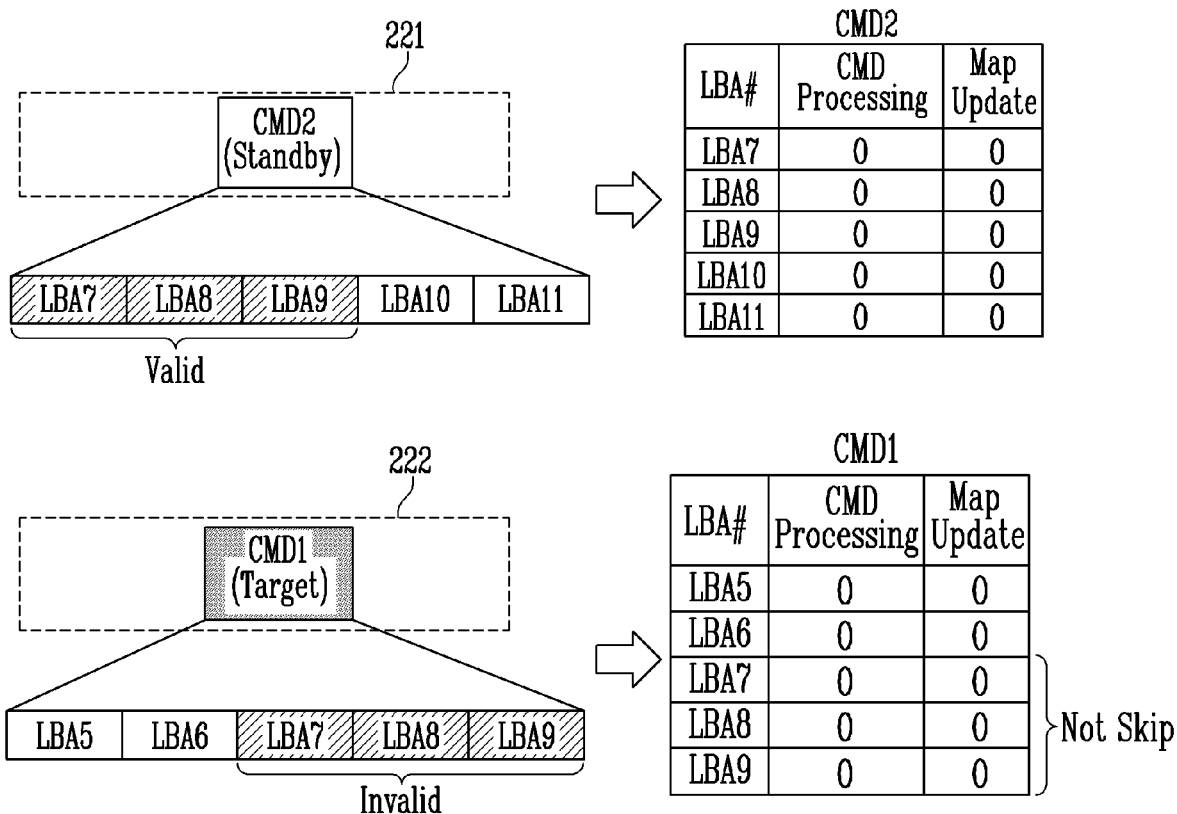

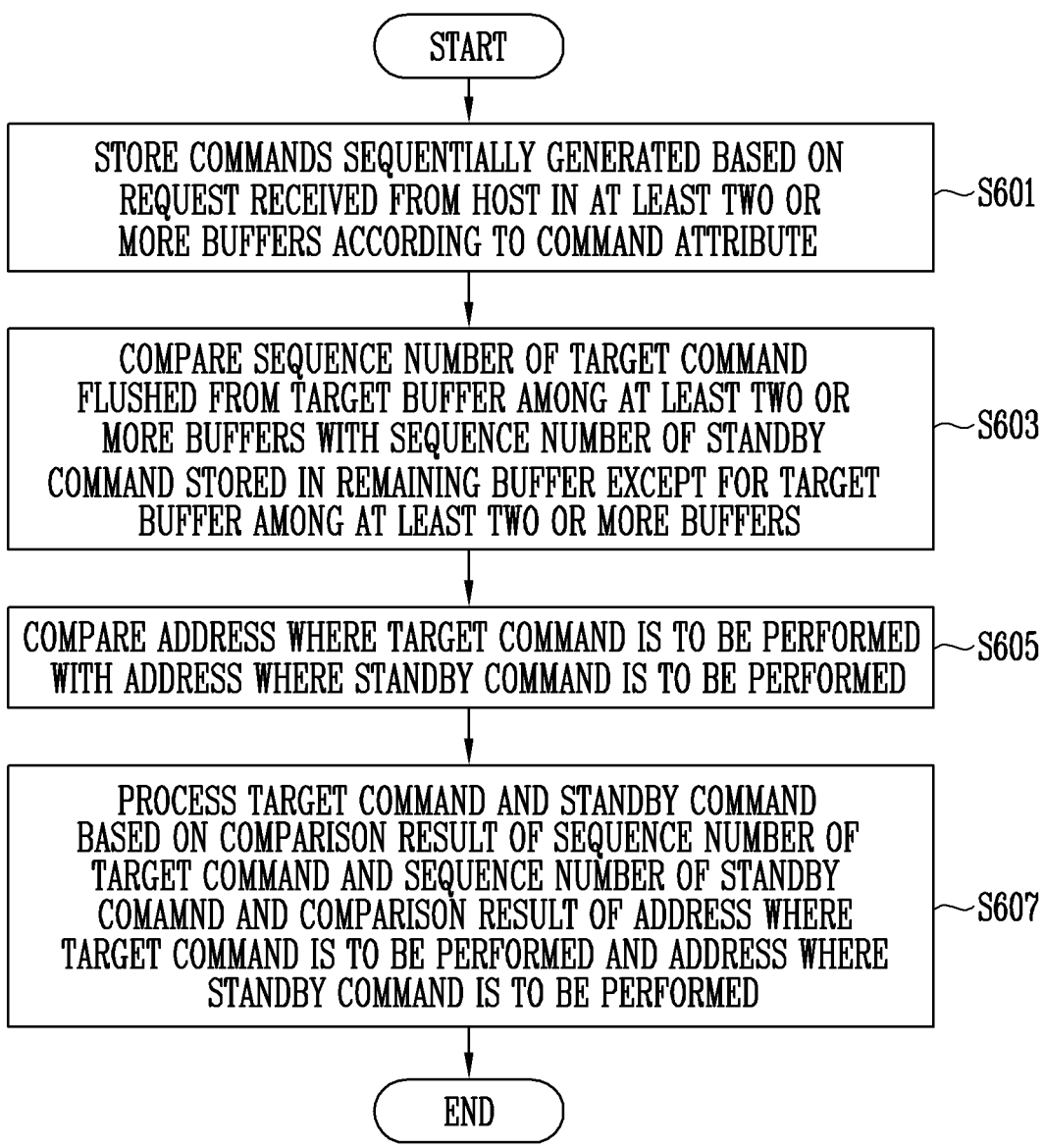

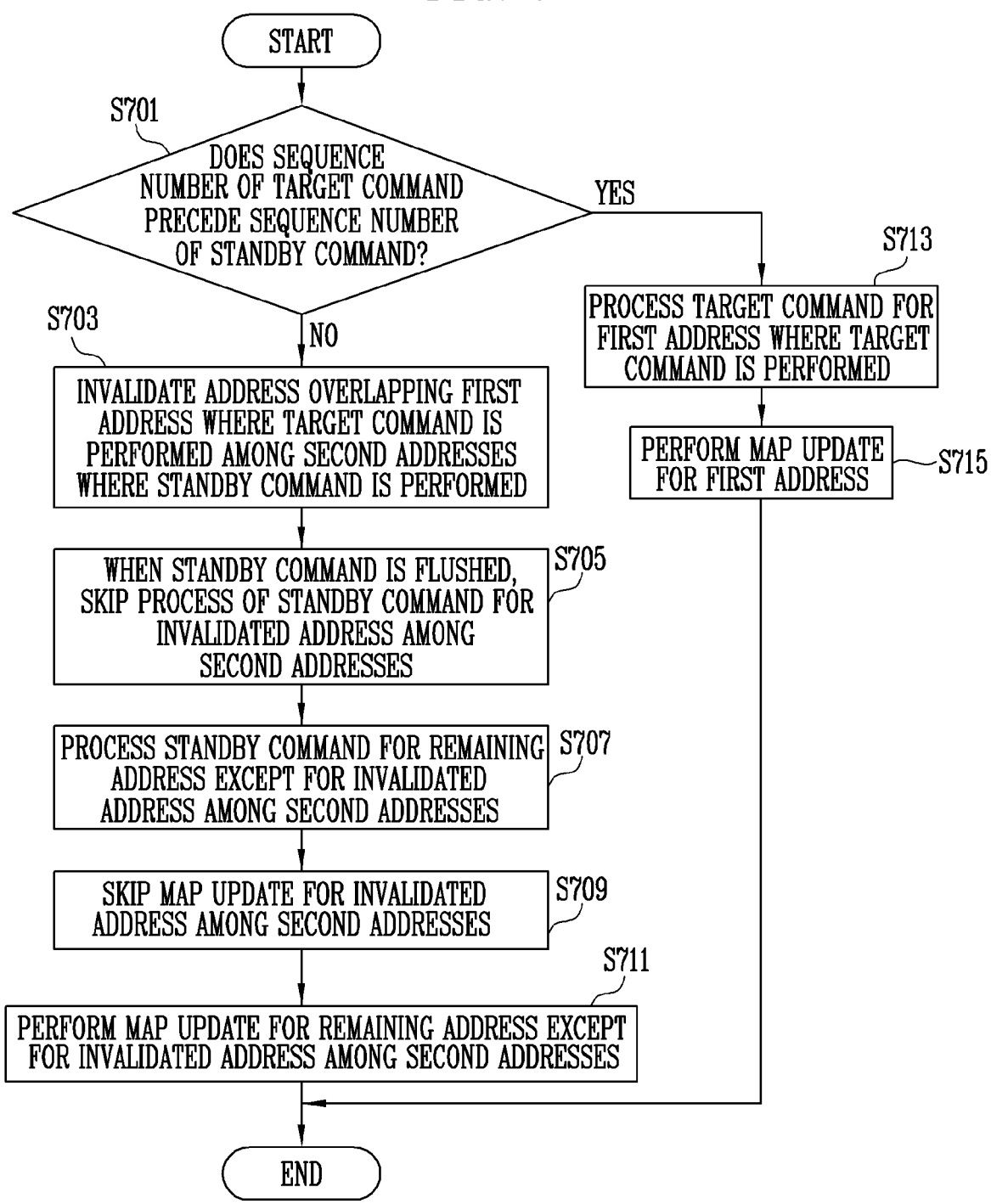

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0108401 filed on Aug. 27, 2020, in the Korean Intellectual Property Office, the entire disclosure of which is incorporated by reference herein.

BACKGROUND

1. Technical Field

The present disclosure relates to an electronic device, and more particularly, to a memory controller and a method of operating the same.

2. Related Art

A storage device is a device that stores data under control of a host device such as a computer or a smartphone. A storage device may include a memory device in which data is stored and a memory controller controlling the memory device. Memory devices can be divided into volatile memory devices and non-volatile memory devices.

A volatile memory device is a device that stores data only when power is supplied and loses the stored data when the power supply is cut off. Examples of a volatile memory device include a static random access memory (SRAM), a dynamic random access memory (DRAM), and the like.

A non-volatile memory device is a device that does not lose data even though power is cut off. Examples of a non-volatile memory device include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory controller having improved multi-buffer performance, and a method of operating the same.

A memory controller according to an embodiment of the present disclosure may include a host interface controller, a plurality of buffers, and a memory operation controller. The host interface controller may sequentially generate a plurality of commands based on a request received from a host. The plurality of buffers may store the plurality of commands according to command attributes. The memory operation controller may compare a sequence number of a target command stored in a target buffer among the plurality of buffers with a sequence number of a standby command stored in remaining buffers, and may determine a process of the target command and a process of the standby command based on a comparison. wherein a buffer satisfying a flush condition among the plurality of buffers is selected as the target buffer.

A method of operating a memory controller according to an embodiment of the present disclosure may include generating commands sequentially based on a request received from a host, storing the sequentially generated commands in a plurality of buffers according to command attributes, comparing a sequence number of a target command stored in a target buffer satisfying a flush condition among the plurality of buffers with a sequence number of a standby command stored in a remaining buffer, comparing first addresses for the target command with second addresses for the standby command to identify an overlapping address and controlling a process of the standby command based on a comparison result of the sequence number of the target command and the sequence number of the standby command.

A method of operating a memory controller according to an embodiment of the present disclosure may include receiving a plurality of requests, sequentially generating a plurality of commands corresponding to the plurality of request in which each of the plurality of commands has a command attribute and a sequence number, sorting the plurality of commands in a command queue into a target buffer and a remaining buffer according to the command attribute of each of the plurality of commands, comparing a sequence number of a command flushed from the target buffer and a sequence number of a command stored in a remaining buffer, comparing a plurality of first addresses corresponding to the command flushed from the target buffer with a plurality of second addresses corresponding to the command stored in a remaining buffer to identify an overlapping address, and skipping the performing of a process of the command from the remaining buffer on the overlapping address when the sequence number of the command flushed from the target buffer is greater than the sequence number of the command stored in the remaining buffer.

According to the present technology, a memory controller having improved multi-buffer performance, and a method of operating the same are provided.

BRIEF DESCRIPTION OF THE DRAWINGS

FIG. 5A is a diagram illustrating a command process and a map update when a sequence number of a target command precedes a sequence number of a standby command, according to an embodiment of the disclosure.

FIG. 5B is a diagram illustrating a P2L table during a map update according to FIG. 5A.

FIG. 6 is a flowchart illustrating an operation of a memory controller according to an embodiment of the disclosure.

FIG. 7 is a flowchart illustrating a portion of the process of FIG. 6 in detail.

DETAILED DESCRIPTION

Specific structural or functional descriptions of embodiments according to the concepts that are disclosed in the present specification or application are illustrated only to describe the embodiments according to the concepts of the present disclosure. The embodiments according to the concepts of the present disclosure may be carried out in various forms and the descriptions are not limited to the embodiments described in the present specification or application.

Figure 1:
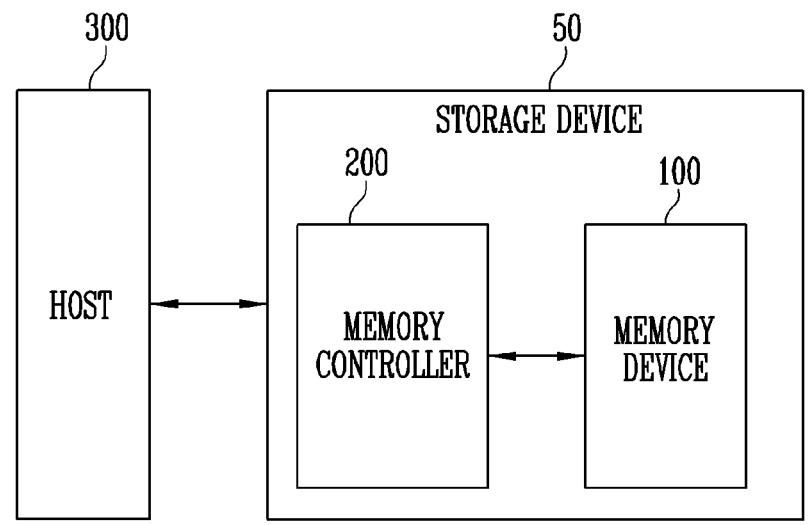
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include a memory device 100 and a memory controller 200 that controls an operation of the memory device. The storage device 50 is a device that stores data under control of a host 300, such as for example a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any one of various types of storage devices such as for example a solid state drive (SSD), a multimedia card (MMC) in a form of an MMC, an embedded MMC (eMMC), an reduced size MMC (RS-MMC) and a micro-MMC, a secure digital card in a form of an SD, a mini-SD card and a micro-SD card, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under the control of the memory controller 200. The memory device 100 may include a memory cell array (not illustrated) that includes a plurality of memory cells that store the data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. A memory block may include a plurality of pages. In an embodiment, a page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command and an address from the memory controller 200 and access a region selected by the address of the memory cell array. That is, the memory device 100 may perform an operation instructed by a command on the region selected by the address. For example, the memory device 100 may perform a write operation (program operation), a read operation, and an erase operation. During the program operation, the memory device 100 may program data to the region selected by the address. During the read operation, the memory device 100 may read data from the region selected by the address. During the erase operation, the memory device 100 may erase data stored in the region selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory cells in which data included in the memory device 100 is to be stored.

The memory controller 200 may control the memory device 100 to perform the program operation, the read operation, or the erase operation in response to a request from the host 300. During the program operation, the memory controller 200 may provide a write command, the PBA, and the data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate and transmit the command, the address, and the data to the memory device 100 regardless of, or independent of, the request from the host 300. For example, the memory controller 200 may provide the command, the address, and the data to the memory device 100 so as to perform background operations such as for example a program operation for wear leveling or a program operation for garbage collection.

In an embodiment, the memory controller 200 may control at least two or more memory devices 100. In this case, the memory controller 200 may control the memory devices 100 according to an interleaving method to improve operation performance. The interleaving method may be an operation method of overlapping operation periods of at least two or more memory devices 100.

The host 300 may communicate with the storage device 50 using at least one of various communication methods such as for example a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
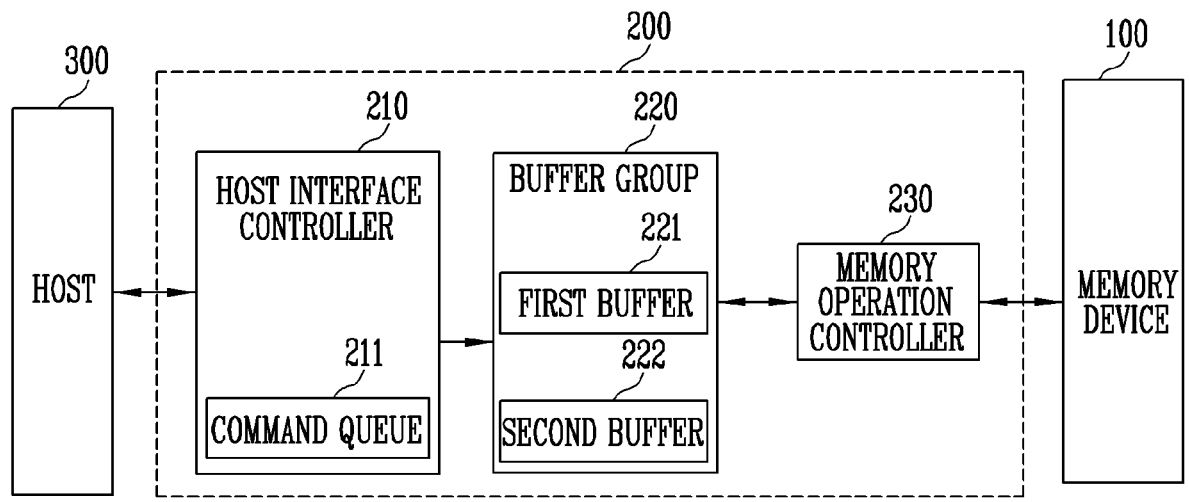
FIG. 2 is a diagram illustrating a configuration and an operation of a memory controller of FIG. 1.

FIG. 2 is a diagram illustrating a configuration and an operation of a memory controller of FIG. 1.

Referring to FIG. 2, a memory controller 200 may include a host interface controller 210, a buffer group 220, and a memory operation controller 230. The host interface controller 210 may include a command queue 211. The buffer group 220 may include at least two or more buffers. In FIG. 2, the buffer group 220 may include a first buffer 221 and a second buffer 222. The number of buffers included in the buffer group 220 is not limited to the present embodiment.

The host interface controller 210 may sequentially generate a command based on a request received from the host 300. The host interface controller 210 may store the sequentially generated commands in the command queue 211.

The command queue 211 may provide the commands stored in a buffer selected from the first buffer 221 and the second buffer 222 included in the buffer group 220 according to a command attribute. The command attribute may indicate at least one of an identification ID of a command group to which a corresponding command belongs and whether the corresponding command is a priority process request command. The provision of the command from the command queue 211 to the buffer group 220 is described later with reference to FIG. 3B.

In an embodiment, the host interface controller 210 may provide information on a sequence number in which the command is generated to the memory operation controller 230.

The first buffer 221 and the second buffer 222 of the buffer group 220 may provide commands stored in a target buffer that satisfy a flush condition to the memory operation controller 230. The flush condition may be determined based on the number of commands stored in the buffer, an amount of data processed according to the command stored in the buffer, the request from the host, or abnormal power off.

For example, the target buffer may be a buffer in which the number of commands stored in the buffer is equal to or greater than a set number. A command stored in the buffer may be flushed to the memory operation controller 230. The target buffer may be a buffer in which the amount of data to be processed according to the commands stored in the buffer is equal to or greater than a set data capacity. The target buffer may be a buffer for which a flush is requested from the host. The target buffer may be a buffer set in advance to be flushed when the abnormal power off is sensed.

The memory operation controller 230 may process a target command received from the buffer group 220. For example, the memory operation controller 230 may control the memory device 100 to perform the target command received from a target buffer that satisfies the flush condition from among at least two or more buffers included in the buffer group 220.

The memory operation controller 230 may compare the sequence number of a target command, flushed from a target buffer that satisfies a flush condition from among the at least two or more buffers included in the buffer group 220, with a sequence number of a standby command stored in the remaining buffer. For example, the first buffer 221 may be the target buffer that satisfies the flush condition and the standby command may be stored in the second buffer 222. The memory operation controller 230 may compare the sequence number of a target command flushed from the first buffer 221 with the sequence number of the standby command stored in the second buffer 222. However, the target buffer is not limited to the present embodiment.

The memory operation controller 230 may compare an address where the target command is to be performed and an address where the standby command is to be performed.

The memory operation controller 230 may skip a process of the standby command with respect to an address when there is overlap between the first address where the target command is to be performed and the second address where the standby command is to be performed.

In an embodiment, when the sequence number of the target command precedes the sequence number of the standby command, the memory operation controller 230 may first process the target command for the first address. The memory operation controller 230 may perform a map update for the first address.

In an embodiment, when the sequence number of the target command is later than the sequence number of the standby command, the memory operation controller 230 may first process the target command for the first address. The memory operation controller 230 may perform a map update for the first address. The memory operation controller 230 may invalidate an address overlapping the first address among the second addresses.

When the standby command is flushed from the second buffer 222, the memory operation controller 230 may skip a process of the standby command for the invalidated address from among the second addresses. The memory operation controller 230 may skip a map update for the invalidated address among the second addresses. The memory operation controller 230 may process the standby command for addresses except for the invalidated address from among the second addresses. The memory operation controller 230 may perform a map update on the addresses except for the invalidated address from among the second addresses.

Figure 3A:
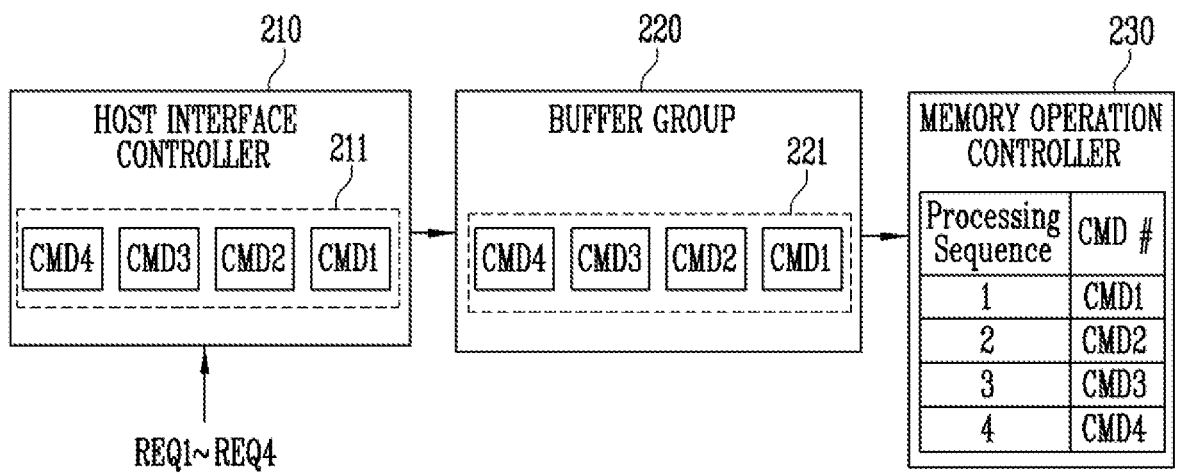
FIG. 3A is a diagram illustrating a command process according to an embodiment of the disclosure.

FIG. 3A is a diagram illustrating a command process according to an embodiment of the disclosure.

Referring to FIG. 3A, a host interface controller 210 may sequentially receive first to fourth requests REQ1 to REQ4 from a host described with reference to FIG. 2. The host interface controller 210 may sequentially generate first to fourth commands CMD1 to CMD4 corresponding to the first to fourth requests REQ1 to REQ4, respectively. The host interface controller 210 may store the sequentially generated first to fourth commands CMD1 to CMD4 in the command queue 211. The command queue 211 may sequentially provide the stored first to fourth commands CMD1 to CMD4 to a first buffer 221 of a buffer group 220.

The first buffer 221 may sequentially store the first to fourth commands CMD1 to CMD4 received from the command queue 211. The first buffer 221 may sequentially provide the first to fourth commands CMD1 to CMD4 to a memory operation controller 230.

The memory operation controller 230 may process the first command CMD1 first according to a sequence number of a command flushed from the first buffer 221. The memory operation controller 230 may process the second command CMD2 secondly. The memory operation controller 230 may process the third command CMD3 thirdly. The memory operation controller 230 may process the fourth command CMD4 fourthly.

In FIG. 3A, all of the first to fourth commands CMD1 to CMD4 may be commands performed with respect to the same address. When only one buffer is present in the buffer group 220, the command may be processed in the memory operation controller 230 according to the sequence number in which the command is generated. Therefore, even though a plurality of commands are performed with respect to the same address, since the most recently generated fourth command CMD4 is performed last, an old/new issue problem is avoided in which a process result for a new command is overwritten with a processing result for an old command.

Figure 3B:
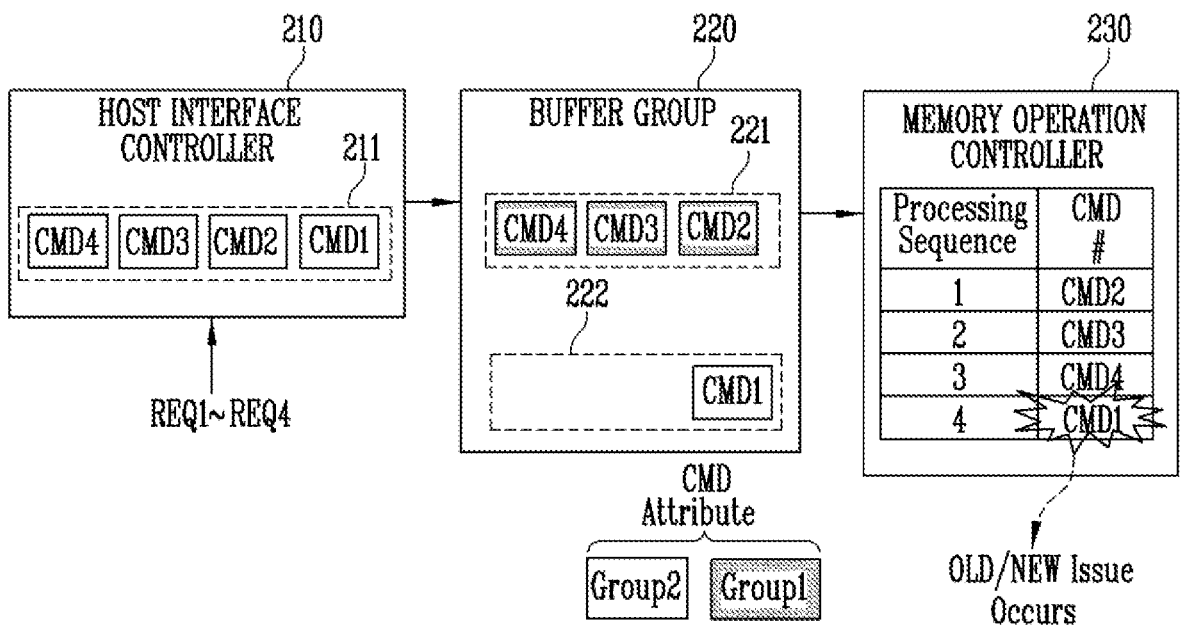
FIG. 3B is a diagram illustrating a command process according to an embodiment of the disclosure.

FIG. 3B is a diagram illustrating a command process according to an embodiment of the disclosure.

Referring to FIG. 3B, the host interface controller 210 may store the sequentially generated first to fourth commands CMD1 to CMD4 in the command queue 211. The command queue 211 may provide the stored first to fourth commands CMD1 to CMD4 to a buffer selected from the first buffer 221 and a second buffer 222 of the buffer group 220 according to a command attribute.

In FIG. 3B, the command attribute of the second to fourth commands CMD2 to CMD4 may be a first group. The command attribute of the first command CMD1 may be a second group. Commands belonging to the same group may be commands requested to be processed together. The number of command groups indicated by a command attribute is not limited to that described in the present embodiment.

In FIG. 3B, when the command attribute is the first group, a command belonging to the first group may be a command for which a process is requested first. For example, the command belonging to the first group may be a command for which a high speed write (write booster) is requested.

The command queue 211 may provide the second to fourth commands CMD2 to CMD4, in which the command attribute indicates the first group, to the first buffer 221. The command queue 211 may provide the first command CMD1, in which the command attribute indicates the second group, to the second buffer 222.

When at least two or more buffers are present in the buffer group 220, a command may be processed in the memory operation controller 230 independent of the sequence number in which the command is generated.

For example, in FIG. 3B, the first buffer 221 may be the target buffer satisfying the flush condition. The second to fourth commands CMD2 to CMD4 stored in the first buffer 221, which is the target buffer, may be flushed to the memory operation controller 230 before the first command CMD1 stored in the second buffer 222, which is the remaining buffer, is flushed to the memory operation controller 230. In this manner, the memory operation controller 230 may process the first command CMD1 after processing the second to fourth commands CMD2 to CMD4. The first command CMD1, which was generated first, may be performed last.

In FIG. 3B, all of the first to fourth commands CMD1 to CMD4 may be commands performed with respect to the same address. Therefore, when a plurality of commands are performed with respect to the same address, an old/new issue may arise in which a process result for a new command is overwritten with a process result for an old command.

Figures 4A, 4B:
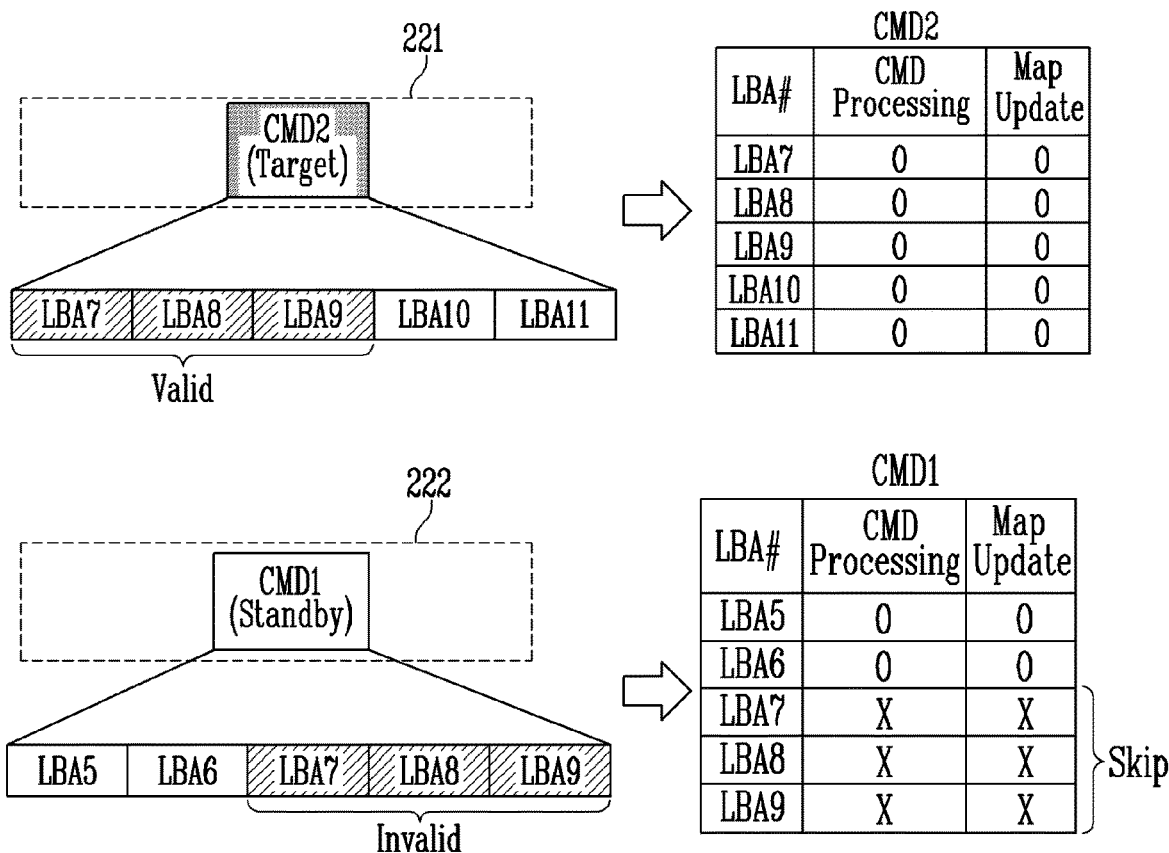
FIG. 4A is a diagram illustrating a command process and a map update when a sequence number of a target command is later than a sequence number of a standby command, according to an embodiment of the disclosure.
FIG. 4B is a diagram illustrating a P2L table during a map update according to FIG. 4A.

FIG. 4A is a diagram illustrating a command process and a map update when a sequence number of a target command is later than a sequence number of a standby command, according to an embodiment of the disclosure.

Referring to FIG. 4A, a second command CMD2 stored in a first buffer 221 may be a target command. A first command CMD1 stored in a second buffer 222 may be a standby command. The second command CMD2, which is the target command, may be processed before the first command CMD1, which is the standby command, is processed.

In FIG. 4A, the first command CMD1 may be performed with respect to first addresses LBA5 to LBA9. The second command CMD2 may be performed with respect to second addresses LBA7 to LBA11. The addresses where the command is performed, however, is not limited to the present embodiment.

When the second command CMD2, which is the target command flushed from the first buffer 221 as the target buffer, is processed, a sequence number of the second command CMD2 may be compared with a sequence number of the first command CMD1, which is the standby command stored in the second buffer 222 as the remaining buffer.

If the sequence number of the second command CMD2 is later than that of the first command CMD1, then the second command CMD2 may be processed first with respect to the second addresses LBA7 to LBA11. The map update may be performed on the second addresses LBA7 to LBA11.

As a result, the addresses LBA7 to LBA9, which overlap the second addresses LBA7 to LBA11 from among the first addresses LBA5 to LBA9 of the first command CMD1 (the standby command), may be invalidated.

When the first command CMD1 is flushed, a process that involves the invalidated addresses LBA7 to LBA9, from among the first addresses LBA5 to LBA9 of the first command CMD1, may be skipped. More specifically, the map update to the invalidated addresses LBA7 to LBA9 from among the first addresses LBA5 to LBA9 may be skipped.

When the first command CMD1 is flushed, the first command CMD1 for the remaining addresses LBA5 to LBA6 from among the first addresses LBA5 to LBA9, and not the invalidated addresses LBA7 to LBA9, may be processed. The map update for the remaining addresses LBA5 to LBA6, except for the invalidated addresses LBA7 to LBA9, from among the first addresses LBA5 to LBA9, may be performed.

FIG. 4B is a diagram illustrating a P2L table during a map update according to FIG. 4A.

Referring to FIG. 4B, the P2L table may store mapping information between a logical address received together with the request from the host and a physical address of the memory device.

In FIG. 4B, a P2L table may include mapping information between an address where each command is to be performed and a physical address of a memory device corresponding thereto. In an embodiment, the physical address of the memory device may be a physical address of an open block in which data is stored.

After the second command CMD2 is processed, map data for the second addresses LBA7 to LBA11, where the second command CMD2 is to be performed, may be generated. After the first command CMD1 is processed, map data for the first addresses LBA5 to LBA9, where the first command CMD1 is to be performed, may be generated.

Referring to the description of FIG. 4A, since the sequence number of the second command CMD2 that is the target command is later than the sequence number of the first command CMD1 that is the standby command, the map data for the second addresses LBA7 to LBA11 where the second command CMD2 is to be performed may be valid.

The map data for the addresses LBA7 to LBA9, which overlap the second addresses LBA7 to LBA11 of the second command CMD2, from among the first addresses LBA5 to LBA9 where the first command CMD1 is to be performed, may be invalidated. The map data for the remaining addresses LBA5 and LBA6, but not the addresses LBA7 to LBA9 overlapping the second addresses LBA7 to LBA11, where the first command CMD1 is to be performed may be valid.

In an embodiment, only the map data that is valid in the P2L table may be updated. In an embodiment, only the map data that is valid in the P2L table may be referenced during a read operation. In an embodiment, the map data that is valid in the P2L table may be utilized in a recovery operation following an abnormal power off.

Through the embodiments described above with reference to FIGS. 4A and 4B, even though at least two or more multiple buffers are used, an old/new issue as described with reference to FIG. 3B may be prevented. That is, even though a sequence number in which a command is generated and a sequence number in which a command is processed by using multiple buffers are different, any old/new issue may be resolved by separately invalidating the overlapping addresses and skipping the process of the command for the overlapping addresses.

FIG. 5A is a diagram illustrating a command process and a map update when a sequence number of a target command precedes a sequence number of a standby command, according to an embodiment of the disclosure.

Referring to FIG. 5A, a second command CMD2 stored in a first buffer 221 may be a standby command. A first command CMD1 stored in a second buffer 222 may be a target command. The first command CMD1, which is the target command, may be processed before the second command CMD2, which is the standby command, is processed.

In FIG. 5A, the first command CMD1 may be performed with respect to first addresses LBA5 to LBA9. The second command CMD2 may be performed with respect to second addresses LBA7 to LBA11. The addresses where the commands are performed are not limited to those used to illustrate the present embodiment.

When the first command CMD1, which is the target command flushed from the second buffer 222 (the target buffer), is processed, the sequence number of the first command CMD1 may be compared with the sequence number of the second command CMD2, which is the standby command stored in the first buffer 221 (the remaining buffer).

Since the sequence number of the first command CMD1 precedes the sequence number of the second command CMD2, the first command CMD1 may be processed with respect to the first addresses LBA5 to LBA9. The map update may be performed on the first addresses LBA5 to LBA9. This is because an old/new issue does not occur because the sequence number of the first command CMD1 precedes the sequence number of the second command CMD2. Therefore, as compared to a process described with reference to FIG. 4A, the process of the first command CMD1 may not be skipped with respect to the addresses LBA7 to LBA9, which overlap the second addresses LBA7 to LBA11, from among the first addresses LBA5 to LBA9 of the first command CMD1. Also, the map update may not be skipped with respect to the addresses LBA7 to LBA9, which overlap the second addresses LBA7 to LBA11, from among the first addresses LBA5 to LBA9 of the first command CMD1.

Since the sequence number of the second command CMD2, which is the standby command, follows the sequence number of the first command CMD1, the second command CMD2 may be processed with respect to the second addresses LBA7 to LBA11. The map update may be performed on the second addresses LBA7 to LBA11.

FIG. 5B is a diagram illustrating a P2L table during a map update according to FIG. 5A.

Referring to FIG. 5B, after the first command CMD1 is processed, the map data for the first addresses LBA5 to LBA9, where the first command CMD1 is to be performed, may be generated. After the second command CMD2 is processed, the map data for the second addresses LBA7 to LBA11, where the second command CMD2 is to be performed, may be generated.

Since the second command CMD2 is processed after the first command CMD1, the map data for the second addresses LBA7 to LBA11 may be more recent than the map data for the first addresses LBA5 to LBA9.

When the map data for the second addresses LBA7 to LBA11 is generated, the map data for the addresses LBA7 to LBA9, which overlap the second addresses LBA7 to LBA11, from among the first addresses LBA5 to LBA9 of the first command CMD1 may be invalidated. The map data for the remaining addresses LBA5 and LBA6, except for the addresses LBA7 to LBA9 overlapping the second addresses LBA7 to LBA11, from among the first addresses LBA5 to LBA9 of the first command CMD1 may be valid.

In an embodiment, only the map data that is valid in the P2L table may be updated. In an embodiment, only the map data that is valid in the P2L table may be referenced during a read operation. In an embodiment, the map data that is valid in the P2L table may be utilized in a recovery operation of abnormal power off.

FIG. 6 is a flowchart illustrating an operation of a memory controller according to an embodiment of the disclosure.

Referring to FIG. 6, in step S601, a memory controller may store commands sequentially generated based on requests received from the host in at least two or more buffers according to one or more command attributes.

In step S603, the memory controller may compare a sequence number of a target command flushed from a target buffer from among the at least two or more buffers with a sequence number of a standby command stored in a remaining buffer, which is not the target buffer, from among the at least two or more buffers.

In step S605, the memory controller may compare an address where the target command is to be performed and an address where the standby command is to be performed.

In step S607, the memory controller may process the target command and the standby command based on a comparison result of the sequence number of the target command and the sequence number of the standby command, and a comparison result of the address where the target command is to be performed and the address where the standby command is to be performed.

In another embodiment, the memory controller may perform step S605 before step S603.

FIG. 7 is a flowchart illustrating a portion of the process of FIG. 6 in detail.

Referring to FIG. 7, in step S701, the memory controller may determine whether the sequence number of the target command precedes the sequence number of the standby command. As a result of the determination, when the sequence number of the target command precedes the sequence number of the standby command, step S713 may be performed. When the sequence number of the target command follows the sequence number of the standby command, step S703 may be performed.

In step S703, the memory controller may invalidate an address that overlaps the first address where the target command is performed from among the second addresses where the standby command is to be performed.

In step S705, when the standby command is flushed, the memory controller may skip the process of the standby command for the invalidated address from among the second addresses.

In step S707, the memory controller may process the standby command for the remaining addresses, except for the invalidated addresses, from among the second addresses.

In step S709, the memory controller may skip the map update for the invalidated addresses from among the second addresses.

In step S711, the memory controller may perform the map update for the remaining addresses, except for the invalidated address, from among the second addresses.

In step S713, the memory controller may process the target command for the first addresses where the target command is to be performed.

In step S715, the memory controller may perform the map update for the first addresses.

Figure 8:
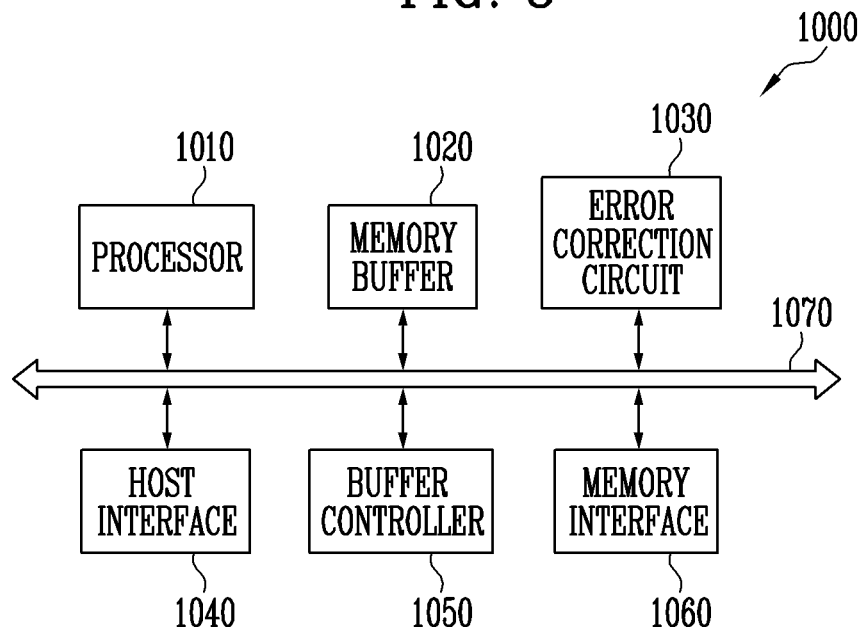
FIG. 8 is a diagram illustrating another embodiment of a memory controller of FIG. 1.

FIG. 8 is a diagram illustrating another embodiment of a memory controller of FIG. 1.

Referring to FIG. 8, a memory controller 1000 is connected to a host Host and a memory device. The memory controller 1000 is configured to access the memory device in response to the request from the host Host. For example, the memory controller 1000 is configured to control the write, read, erase, and background operations of the memory device. The memory controller 1000 is configured to provide an interface between the memory device and the host Host. The memory controller 1000 is configured to drive firmware for controlling the memory device.

The memory controller 1000 may include a processor 1010, a memory buffer 1020, an error correction circuit (ECC) 1030, a host interface 1040, a buffer control circuit (Buffer Controller) 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the FTL. The FTL may receive the LBA using a mapping table and convert the LBA into the PBA. There are several address mapping methods of the FTL according to a mapping unit. Representative address mapping methods include a page mapping method, a block mapping method, and a hybrid mapping method.

The processor 1010 is configured to randomize data received from the host Host. For example, the processor 1010 may randomize the data received from the host Host using a randomizing seed. The randomized data is provided to the memory device as data to be stored and is programmed to a memory cell array.

The processor 1010 is configured to de-randomize data received from the memory device during the read operation. For example, the processor 1010 may de-randomize the data received from the memory device using a de-randomizing seed. The de-randomized data may be output to the host Host.

As an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction circuit (ECC) 1030 may perform error correction. The ECC 1030 may perform error correction encoding (ECC encoding) on data to be written to the memory device through the memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), PCI express, a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1202, and the memory interface 1060.

In an embodiment, the host interface controller 210 of FIG. 2 may be included in the host interface 1040. The buffer group 220 may be included in the memory buffer 1020. The memory operation controller 230 may be included in the processor 1010.

Figure 9:
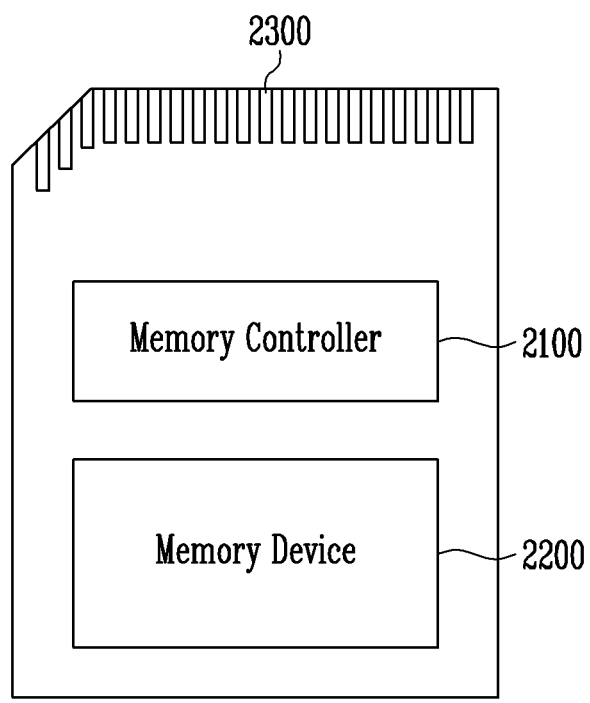
FIG. 9 is a block diagram illustrating a memory card system to which a storage device according to an embodiment of the present disclosure is applied.

FIG. 9 is a block diagram illustrating a memory card system to which a storage device according to an embodiment of the present disclosure is applied.

Referring to FIG. 9, a memory card system 2000 includes a memory controller 2100, a memory device 2200, and a connector 2300.

The memory controller 2100 may be connected to the memory device 2200. The memory controller 2100 may be configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 10:
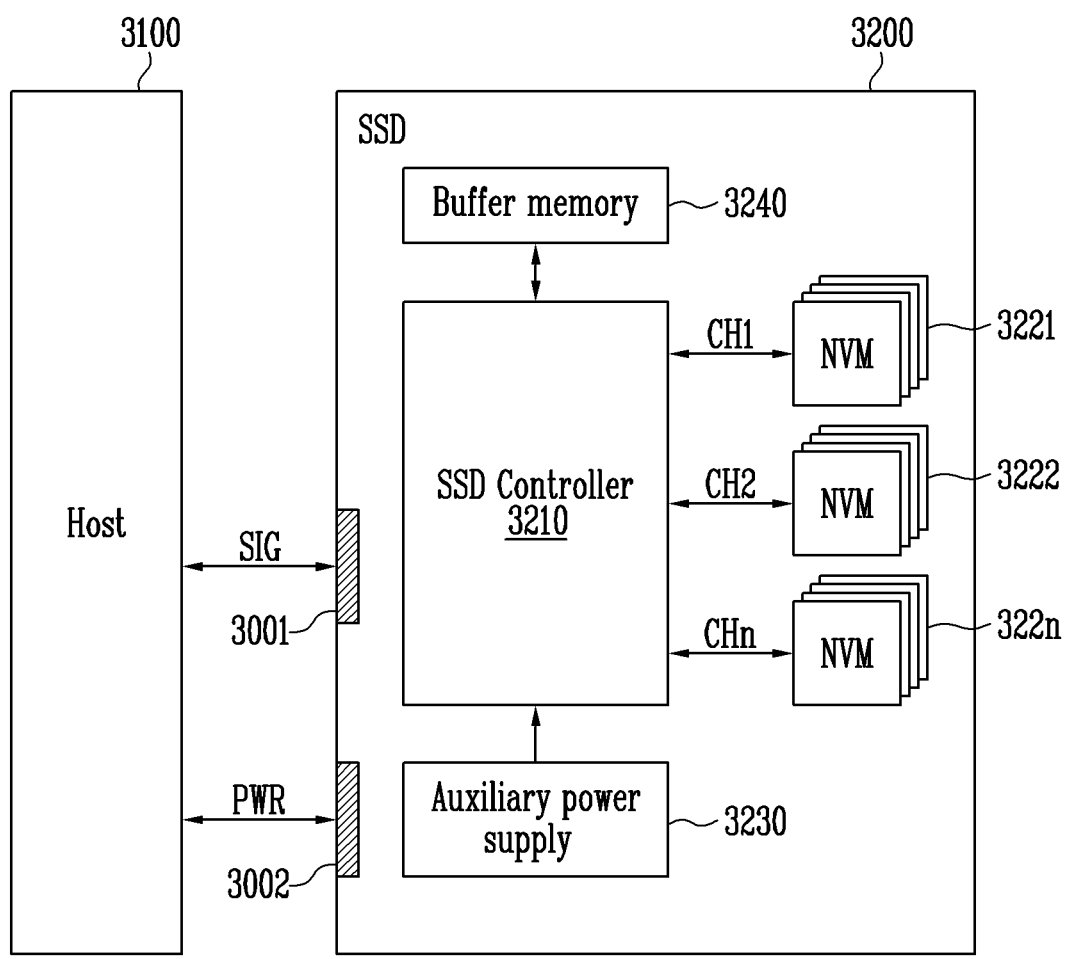
FIG. 10 is a block diagram illustrating a solid state drive (SSD) system to which a storage device according to an embodiment of the present disclosure is applied.

FIG. 10 is a block diagram illustrating a solid state drive (SSD) system to which a storage device according to an embodiment of the present disclosure is applied.

Referring to FIG. 10, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322*n* (where n is an integer), an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322*n* in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322*n*, or may temporarily store metadata (for example, a mapping table) of the flash memories 3221 to 322*n*. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 11:
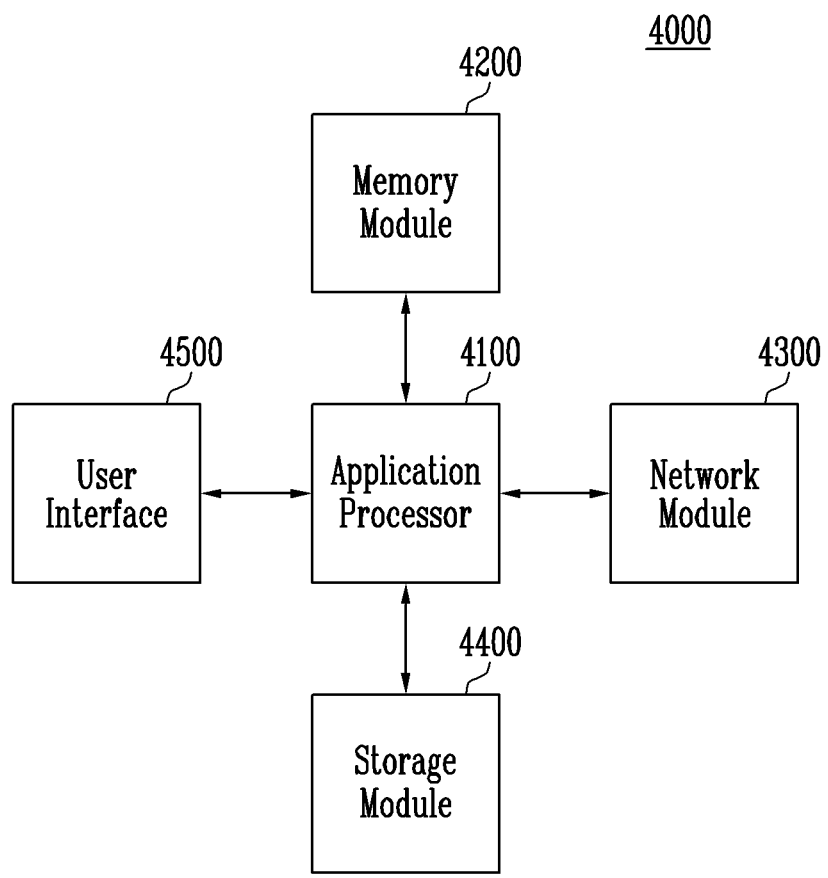
FIG. 11 is a block diagram illustrating a user system to which a storage device according to an embodiment of the present disclosure is applied.

FIG. 11 is a block diagram illustrating a user system to which a storage device according to an embodiment of the present disclosure is applied.

Referring to FIG. 11, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A memory controller comprising:
  a host interface controller configured to sequentially generate a plurality of commands based on a request received from a host;
  a plurality of buffers configured to store the plurality of commands according to command attributes; and
  a memory operation controller configured to compare a sequence number of a target command stored in a target buffer among the plurality of buffers with a sequence number of a standby command stored in remaining buffers, and to determine a process of the target command and a process of the standby command based on a comparison result and whether first addresses for the target command and second addresses for the standby command are overlapped,
  wherein a buffer satisfying a flush condition among the plurality of buffers is selected as the target buffer.

2. The memory controller of claim 1, wherein the memory operation controller determines the process of the standby command based on a comparison between the first addresses for the target command and the second addresses for the standby command.

3. The memory controller of claim 2, wherein the memory operation controller skips an operation according to the standby command on an overlapping address between the first addresses and the second addresses based on the comparison result.

4. The memory controller of claim 3, wherein when the sequence number of the target command precedes the sequence number of the standby command, the memory operation controller processes the target command for the first addresses and performs a map update for the first addresses.

5. The memory controller of claim 3, wherein when the sequence number of the target command follows the sequence number of the standby command, the memory operation controller invalidates the overlapping address from among the second addresses.

6. The memory controller of claim 5, wherein the memory operation controller skips the operation according to the standby command for the invalidated overlapping address from the second addresses and a map update for the invalidated overlapping address.

7. The memory controller of claim 5, wherein the memory operation controller performs the operation according to the standby command and a map update on the second addresses, except for the invalidated overlapping address.

8. The memory controller of claim 1, wherein the host interface controller includes a command queue that stores the sequentially generated plurality of commands, and
  the command queue provides the sequentially generated plurality of commands to the plurality of buffers based on the command attributes,
  wherein the command attributes indicate at least one of a command group identification of a command and whether the command is a priority process request command.

9. The memory controller of claim 1, wherein the flush condition is determined based on the number of commands stored in the target buffer, an amount of data processed according to the commands stored in the target buffer, the request of the host, or an abnormal power off.

10. A method of operating a memory controller, the method comprising:
  generating commands sequentially based on a request received from a host;
  storing the sequentially generated commands in a plurality of buffers according to command attributes;
  comparing a sequence number of a target command stored in a target buffer satisfying a flush condition among the plurality of buffers with a sequence number of a standby command stored in a remaining buffer;
  comparing first addresses for the target command with second addresses for the standby command to identify an overlapping address; and
  controlling a process of the standby command based on a comparison result of the sequence number of the target command and the sequence number of the standby command.

11. The method of claim 10, further comprising:
  processing the target command for the first addresses when the sequence number of the target command precedes the sequence number of the standby command; and
  performing a map update for the first addresses.

12. The method of claim 10, wherein the command attributes indicate at least one of a command group identification of a command and whether the command is a priority process request command.

13. The method of claim 10, further comprising:
processing the target command for the first addresses when the sequence number of the target command follows the sequence number of the standby command; and
invalidating the overlapping address from the second addresses.

14. The method of claim 13, further comprises:
skipping an operation according to the standby command on the invalidated overlapping address from the second addresses; and
processing the operation according to the standby command on the second addresses except for the invalidated overlapping address.

15. The method of claim 14, further comprising:
performing a map update for the second addresses except for the invalidated overlapping address.

16. The method of claim 10, wherein the flush condition is determined based on the number of commands stored in the target buffer, an amount of data processed according to the commands stored in the target buffer, the request of the host, or an abnormal power off.

17. A method of operating a memory controller, the method comprising:
receiving a plurality of requests;
sequentially generating a plurality of commands corresponding to the plurality of requests in which each of the plurality of commands has a command attribute and a sequence number;
sorting the plurality of commands in a command queue into a target buffer and a remaining buffer according to the command attribute of each of the plurality of commands;
comparing a sequence number of a command flushed from the target buffer and a sequence number of a command stored in a remaining buffer;
comparing a plurality of first addresses corresponding to the command flushed from the target buffer with a plurality of second addresses corresponding to the command stored in a remaining buffer to identify an overlapping address; and
skipping the performing of a process of the command from the remaining buffer on the overlapping address when the sequence number of the command flushed from the target buffer is greater than the sequence number of the command stored in the remaining buffer.

18. The method of claim 17, further comprising
performing a process of the command flushed from the target buffer before performing a process of the command from the remaining buffer regardless of a result from comparing sequence numbers.

* * * * *